United States Patent
Foley et al.

[11] Patent Number: 5,944,531
[45] Date of Patent: Aug. 31, 1999

[54] ORAL HYGIENE INSTRUCTIONAL DISPLAY

[76] Inventors: Rita S. Foley; Patrick F. Foley, both of 1214 Eric La., Lake Zurich, Ill. 60047

[21] Appl. No.: 09/063,724
[22] Filed: Apr. 21, 1998
[51] Int. Cl.⁶ .................................................. G09B 23/30
[52] U.S. Cl. ........................................ 434/263; 434/262
[58] Field of Search ................................ 434/219, 263, 434/262, 309

[56] References Cited

U.S. PATENT DOCUMENTS

| | | |
|---|---|---|
| 1,923,978 | 4/1933 | Hill . |
| 1,967,786 | 7/1934 | Schulz ..................................... 434/263 |
| 2,926,487 | 3/1960 | Stone . |
| 3,998,234 | 12/1976 | Stubbmann . |
| 4,435,163 | 3/1984 | Schmitt et al. ........................ 434/263 |
| 4,770,637 | 9/1988 | Harrell, Jr. ............................. 434/263 |
| 4,788,734 | 12/1988 | Bauer . |
| 4,836,415 | 6/1989 | Grussmark . |
| 4,866,807 | 9/1989 | Kreit et al. . |
| 4,902,232 | 2/1990 | Neustadter ............................ 434/263 |
| 4,934,940 | 6/1990 | Savery . |
| 4,991,755 | 2/1991 | Grusmark . |
| 5,044,037 | 9/1991 | Brown . |
| 5,120,229 | 6/1992 | Moore et al. .......................... 434/263 |
| 5,232,370 | 8/1993 | Hoye ...................................... 434/263 |
| 5,570,325 | 10/1996 | Arpadi . |
| 5,810,601 | 9/1998 | Williams ............................... 434/262 |

FOREIGN PATENT DOCUMENTS 2226086  8/1974  France ................................. 434/263

Primary Examiner—Paul J. Hirsch
Assistant Examiner—Michael B. Priddy
Attorney, Agent, or Firm—Wallenstein & Wagner, Ltd.

[57] ABSTRACT

An oral hygiene instructional display of a human mouth, including a body, an upper arch comprised of a representation of a plurality of teeth, a lower arch which is inverted from the upper arch comprised of a representation of a plurality of teeth, a timer having a display on the body, and an audible source capable of producing sounds. The teeth of the upper arch and the teeth of the lower are all capable of being individually illuminated. Additionally, the teeth of the upper arch and the teeth of the lower arch each have numerous surfaces thereof displayed, with each surface capable of being individually illuminated. The instructional display is capable of being adjusted wherein the audible sounds vary as different teeth or surfaces of teeth are illuminated, wherein multiple teeth or surfaces of teeth are illuminated simultaneously as a group, and/or wherein the timer is adjusted for longer or shorter brushing periods.

33 Claims, 5 Drawing Sheets

ORAL HYGIENE INSTRUCTIONAL DISPLAY

TECHNICAL FIELD

The present invention relates generally to oral hygiene displays which provide audio and visual instructions as to the proper duration and location for brushing the teeth throughout the mouth.

BACKGROUND OF THE INVENTION

Frequent and proper tooth brushing is an essential element to adequate oral hygiene. Proper oral hygiene is the most important factor in combating periodontal disease. Both the duration and the balance of brushing throughout the mouth are two common weaknesses in typical brushing skills. Children and adults alike often spend an adequate amount of time brushing the facial surfaces of their teeth, while consistently spending less time or entirely omitting the lingual and palatal surfaces thereof. Additionally, the molars and bicuspids often receive less brushing than the incisors and canines. In order for the effects of brushing to meet the standards of proper oral hygiene, each surface of one's teeth, including the facial and palatal (for the upper teeth), facial and lingual (for the lower teeth), and the occlusal surface, must receive ample brushing time. Additionally, each of the different types of teeth, including the incisors, canines, bicuspids and molars also must receive ample brushing time. Prior attempts to provide a teaching mechanism for proper brushing, however, have concentrated primarily on the overall duration of the brushing process. They have not attempted to solve the problem of proper coverage of all teeth and surfaces of teeth in the mouth, including properly balancing the overall brushing time between each type and surface of tooth in the mouth.

Typical dental timing devices have been comprised primarily of audio or visual timers. Such devices are disclosed in U.S. Pat. Nos. 1,923,978; 4,778,734; 4,836,415; 4,866,807; 4,991,755; and 5,044,037. Other devices include a visual display of cartoon-type teeth and are disclosed in U.S. Pat. Nos. 2,926,487; 4,934,940; and, 5,570,325.

Regarding brushing timers, U.S. Pat. No. 1,923,978 discloses a dental timer connected to a tooth brush holder. The timer is merely comprised of a rotatably mounted time glass adapted to operate for the length of time required to properly brush the teeth. U.S. Pat. No. 4,788,734 discloses a toothbrush having a means for emitting audio signals from the handle of the toothbrush for a period of two minutes. The audio signals may include a melody and/or spoken words. U.S. Pat. No. 4,836,415 discloses a toothpaste dispenser with a timer device which provides a signal to indicate the time period during which the teeth should be brushed. U.S. Pat. No. 4,866,807 discloses a figurehead which is detachably attached to a standard toothbrush. The figurehead comprises a digital sound generator which plays four tunes of 2 to 3 minutes in duration, and a digital voice synthesizer which provides cleaning instructions at certain intervals within the period of time during which a particular tune plays. U.S. Pat. No. 4,991,755 discloses a toothpaste dispenser including a timer device structured to deliver a signal to indicate a time period of sufficient length for brushing one's teeth. The timer is activated by depressing a button or by depressing the plunger for dispensing toothpaste from the container. U.S. Pat. No. 5,044,037 discloses a toothbrush having a sound generator housed within the handle which plays a musical tune for a predetermined time period.

Regarding audio and visual brushing timers, U.S. Pat. No. 2,926,487 discloses a toothbrush holder and animated brushing timer. The animated display device includes a representation of a caricatured figure engaged in the act of brushing its teeth by means of a movable hand and simulated toothbrush held therein. U.S. Pat. No. 4,934,940 discloses a humanoid figure with a humanoid facial expression exhibiting representations of sectors of teeth in adjacent upper and lower jaws. Each sector has light emitting diodes of different colors which flashingly illuminate in sequence when that sector is to be brushed by the user. A circuit adjustably controls both the duration of the period of brushing devoted to each sector, as well as the flash period during illumination of each cycle. U.S. Pat. No. 5,570,325 discloses a tooth brush timer device which presents a visual representation of the time required for a child to brush his or her teeth. The device comprises a static character face having a mouth region and a visual indicator disposed behind the mouth region. The visual indicator is capable of showing a white color for representing clean teeth and a non-white color for representing dirty teeth. The teeth portion animates a gradual transition from a non-white color to a white color over a predetermined period of time indicating the appropriate period of time for a child to brush their teeth.

Each of the above devices generally focuses on merely attempting to maintain the attention of an individual, generally a child, for a designated period of time. Additionally, none of the devices actually displays a visual representation of the teeth of the mouth which matches that of the user. Prior devices generally omit displaying the palatal and lingual surfaces of the teeth. Finally, none of the devices instructs or teaches the user how to distribute the brushing effort throughout the mouth, including the different surfaces and regions or individual teeth of the mouth. Accordingly, the present invention provides a means for resolving the above-mentioned deficiencies.

SUMMARY OF THE INVENTION

Generally, the present invention provides an oral hygiene instructional display of the human mouth. The display provides a more sophisticated level of detail of the different teeth and surfaces of teeth in the mouth that a dental professional desires. The display includes audio and visual instructions as to the proper duration and location for brushing the teeth throughout the mouth. The instructional display is comprised of a body, a representation of a plurality of teeth forming upper and lower arches or jaws which illuminate, a timer, and an audio source.

The body of the instructional display has a first side, a second side, a top and a bottom. The first side of the body includes representations of teeth, a timer display, and function buttons thereon.

The plurality of representations of teeth are divided into upper and lower arches or jaws. The arch portraying the upper jaw is curved such that the apex of the upper arch extends toward the top of the body and the lower arch is curved such that the apex of the lower arch extends toward the bottom of the body. The display of the teeth are such that incisors, canines, bicuspids and molars are each depicted in the upper and lower jaws. Additionally, the various surfaces of the teeth of the upper and lower jaws are depicted. In one embodiment of the present invention each of the individual teeth can be individually illuminated as an instructional tool to visually show the user which teeth should be brushed during a specific interval. Multiple individual teeth can be illuminated simultaneously as a group (sextant, quadrant or other size) which visually shows the user which teeth to brush during a specific interval. In another embodiment, the different surfaces of the teeth illuminate to visually show the user which surfaces of the teeth to brush during a specific interval.

The timer component includes an internal timing device which engages when the instructional display is turned on. A display of the elapsed time or time remaining for the brushing period is located on the first side of the body. As the overall time elapses, the electrical circuitry of the device manipulates the lighting of the teeth and various audio signals.

The audio source works in conjunction with the illuminating teeth. The audio source is controlled by the electronic circuitry of the device and produces different sounds when different teeth or surfaces of teeth are illuminated. The audio source also maintains a certain frequency of tones to orchestrate the velocity or frequency of brushing strokes.

The instructional display may also include function buttons which allow the user to change and modify modes, including toggling the audio source on and off, varying the grouping or size of grouping of teeth or surfaces of teeth which are simultaneously illuminated, and adjusting the timer for longer or shorter brushing periods.

In a first aspect of the present invention there is provided an oral hygiene instructional display which depicts a representation of the human mouth as viewed by the user, thereby providing a clear indication of which teeth are to be brushed during different intervals.

In a second aspect of the present invention there is provided an illuminating representation of the various facial, lingual, palatal and occlusal surfaces of the teeth.

In a third aspect of the present invention there is provided an audio signal indicating when the user is to switch to the next sequence of teeth and prompting the user to examine the visual display.

In a fourth aspect of the present invention there is provided a means for modifying the parameters of the instructional unit, including sound, duration, sequence and grouping of teeth to be brushed.

In a fifth aspect of the present invention there is provided a device which is tailored to both adults and children, providing actual representations of the correct amount of teeth for the differing adult and children's sets of teeth.

In an additional aspect of the present invention there is provided an oral hygiene instructional device which can be easily and inexpensively manufactured such that a wide range of people can use and afford the device. Thus, the device will be generally available to the entire public for use to improve oral hygiene. Additionally, the low cost and wide range of applicability of this device allows it to be available to individuals directly via dental professionals, or through standard routes of commerce.

Other advantages and aspects of the present invention will become apparent upon reading the following description of the drawings and detailed description of the invention, in conjunction with the drawings.

BRIEF DESCRIPTION OF THE DRAWINGS

In order that the present invention may be understood, it will now be described by way of example, with reference to the following drawings.

DETAILED DESCRIPTION

Figure 1:
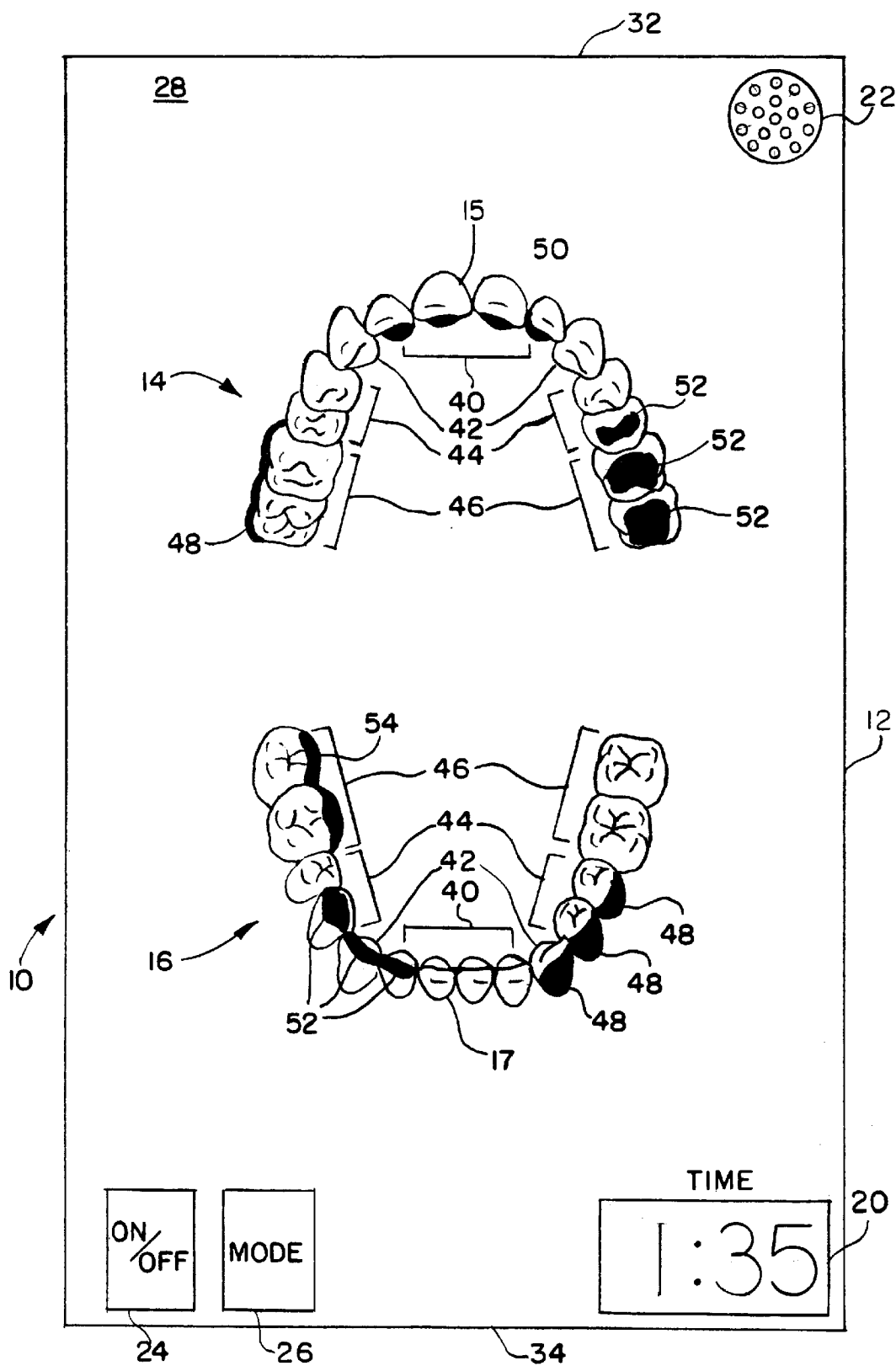
FIG. 1 is a front elevation view of an oral hygiene instructional display according to one embodiment of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring now in detail to the drawings and initially to FIG. 1, there is shown a preferred form of the oral hygiene instructional display 10 constructed in accordance with the present invention. The oral hygiene instructional display 10 is comprised of a body 12 having a representation of a plurality of teeth in the form of a first arch 14 and a second arch 16. The teeth of the first and second arches 14,16 can be individually illuminated during operation of the instructional display 10. The instructional display 10 also comprises a timer having a timer display 20, an audible source, including a speaker 22 which produces sounds in conjunction with the illumination of the teeth, and a plurality of function buttons 24,26 which control the different features of the instructional display 10. Additionally, the instructional display 10 comprises a means for attaching the instructional display 10 to a surface during usage and storage thereof. In operation, the teeth, or portions of the teeth, sequentially illuminate to instruct the user as to the location and duration of brushing for a specific period. Additionally, sounds project from the device to alert the user of a sequence change and to help the user maintain proper brushing cadence. The sounds also help to keep the attention of the user during operation.

The body 12 of the instructional display 10 has a first side 28, a second side 30, a top 32, and a bottom 34. As illustrated in FIG. 1, the body 12 preferably is of a rectangular shape. Other shapes in the form of a square, circle, tooth, or other geometric shape or figure may be used for the body 12 as well. The body 12 is approximately 0.25 inches in thickness. As such, the instructional display 10 is small and inconspicuous. Thus, the instructional display 10 may be used daily at home, as well as when traveling. The body 12 is preferably made of a plastic, however, other materials including, but not limited to, metal, rubber or other polymers may be utilized. Additionally, the body 12 is preferably waterproof such that the instructional display 10 can be utilized in the shower or other humid/wet environments. The plurality of teeth in the form of the first and second arches 14,16 are located on the first side 28 of the body 12. The timer display 20 and the function buttons 24,26 also are each located on the first side 28 of the body 12. The speaker 22 is generally located on the first side 28 of the body, however, the speaker 22 may alternately be located on the second side 30.

Figure 2:
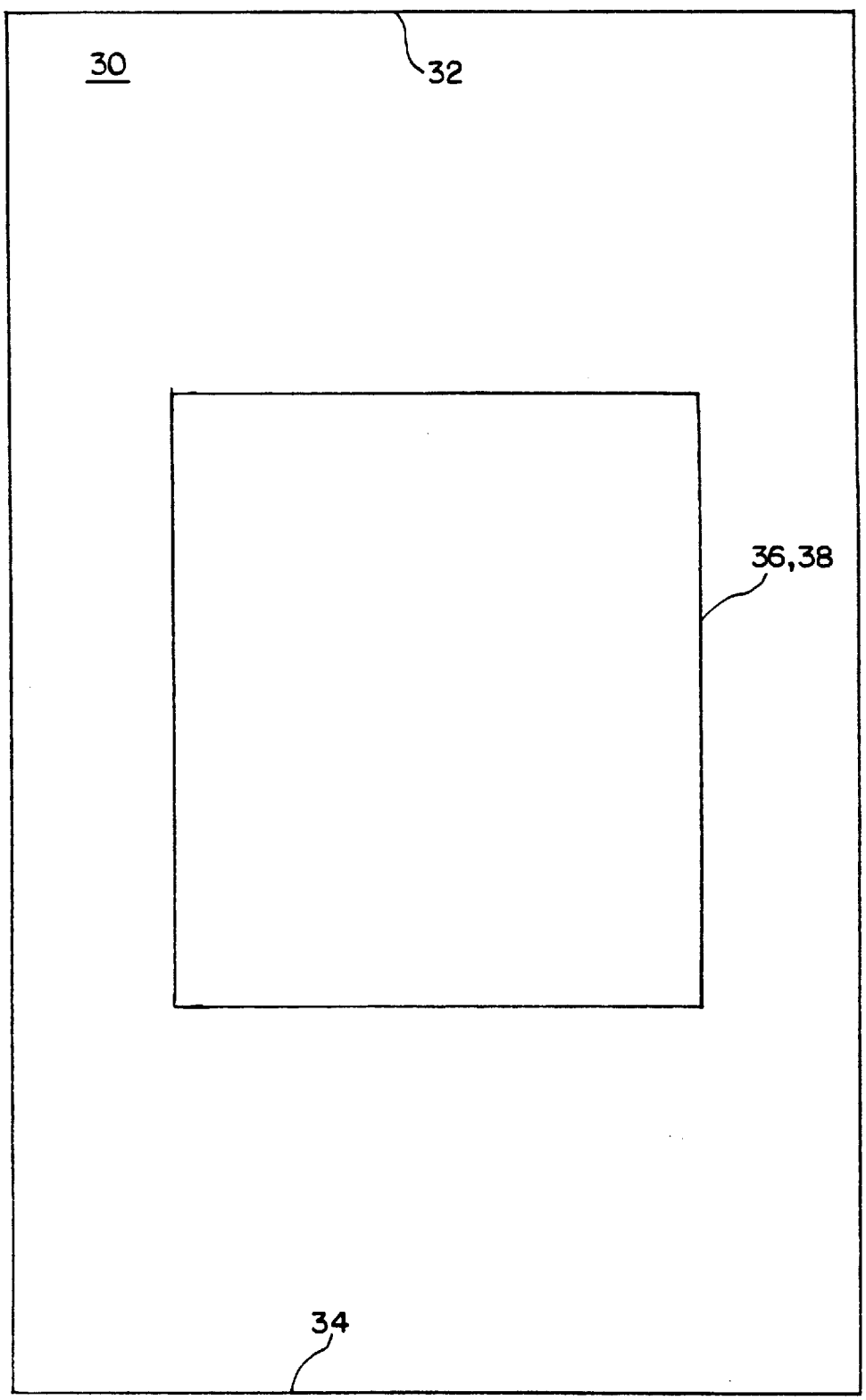
FIG. 2 is a rear elevation view of the oral hygiene instructional display illustrated in FIG. 1.

The means for attaching the instructional display 10 to a surface during usage or storage thereof is contained on the second side 30 of the display, as shown in FIG. 2. The means includes either a magnetic portion 36 or an adhesive portion 38. Other means may be utilized including, but not limited to, velcro, glue, screws, hooks, suction cups and/or stands. Through the attachment means, the instructional display 10 can be secured to a mirror, medicine cabinet, wall, door, window, or merely set on a counter top or other surface.

As illustrated in the embodiment of FIG. 1, the representation or schematic of the plurality of teeth in the form of a first arch 14 and a second arch 16 is located on the first side 28 of the instructional display 10. Each arch 14,16 accurately reflects what an individual sees when he/she views his/her own mouth in a mirror. As such, the first or upper arch 14 schematically displays a visual representation of the teeth of an individual's upper jaw. The first arch 14 of teeth is generally in the shape of a parabola, having an apex or vertex 15. The apex 15 of the first arch 14 extends toward the top 32 of the body 10. The plurality of teeth in the first arch 14 includes incisors 40, canines 42, bicuspids or premolars 44 and molars 46. Generally, the teeth are adjacent at least one other tooth. Additionally, the first arch 14 displays the various surfaces for each kind of tooth, including the facial 48 (outer surface), palatal 50 (inner surface) and occlusal 52 (grinding surface) surfaces.

The second or lower arch 16 schematically displays a visual representation of the teeth of an individual's lower jaw. Like the first arch 14, the second arch 16 is generally in the shape of a parabola, having an apex or vertex 17. Contrary to the first arch 14, however, the apex 17 of the second arch 16 extends toward the bottom 34 of the body 10. As such, the first arch 14 is inverted from, or extends away from the second arch 16. The plurality of teeth in the second arch 16 also includes incisors 40, canines 42, bicuspids or premolars 44 and molars 46. Additionally, the second arch 16 displays the various surfaces for each kind of tooth, including the facial 48 (outer surface), lingual 54 (inner surface) and occlusal 52 (grinding surface) surfaces.

Figure 3A:
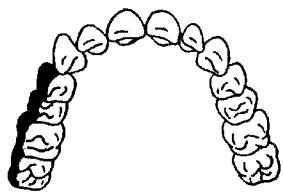
FIGS. 3A through 3R are front elevation views of the oral hygiene instructional display of FIG. 1, illustrating sequences of illuminations for different groups of teeth; and, FIG. 4 is a front elevation view of an oral hygiene instructional display of FIG. 1, illustrating the illumination of a single surface of a single tooth.
Figure 3A:
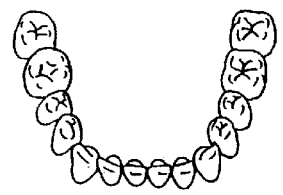
Figure 3B:
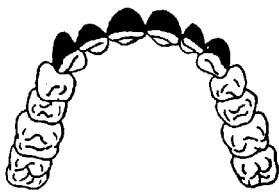
Figure 3B:
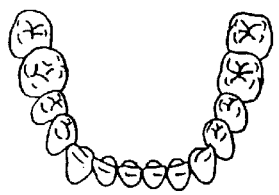
Figure 3C:
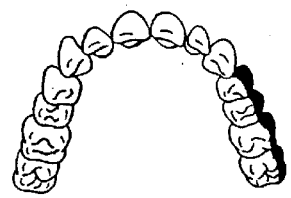
Figure 3C:
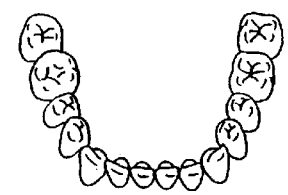
Figure 3D:
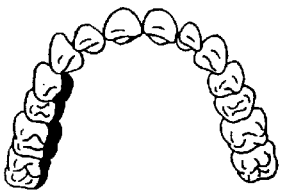
Figure 3D:
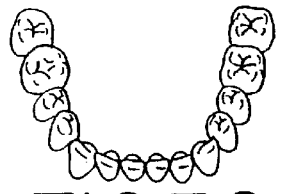
Figure 3E:
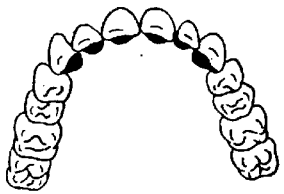
Figure 3E:
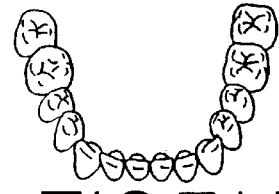
Figure 3F:
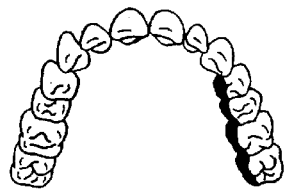
Figure 3F:
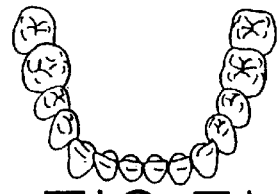
Figure 3G:
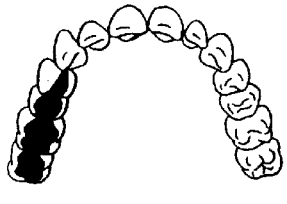
Figure 3G:
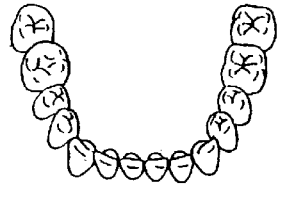
Figure 3H:
Figure 3H:
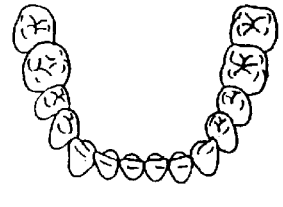
Figure 3I:
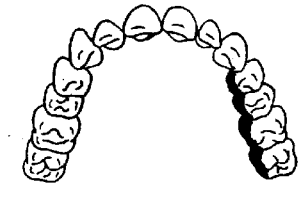
Figure 3I:
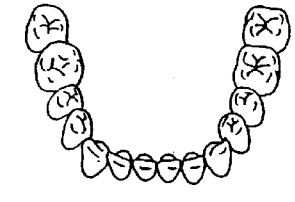
Figure 3J:
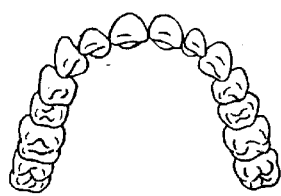
Figure 3K:
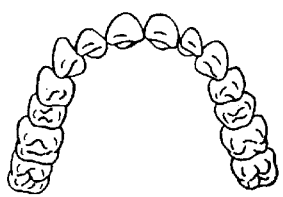
Figure 3L:
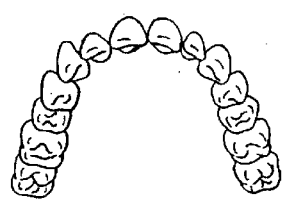
Figure 3L:
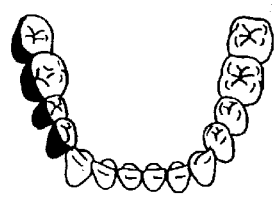
Figure 3M:
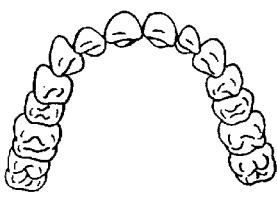
Figure 3M:
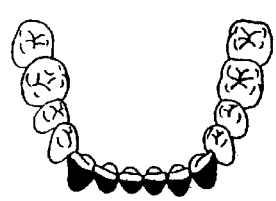
Figure 3N:
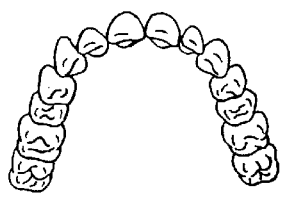
Figure 3N:
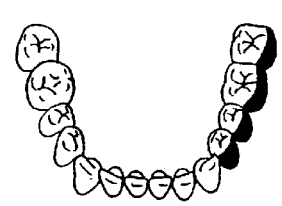
Figure 3O:
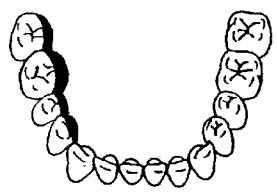
Figure 3O:
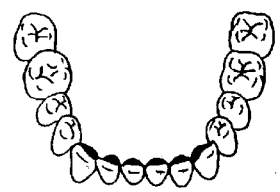
Figure 3O:
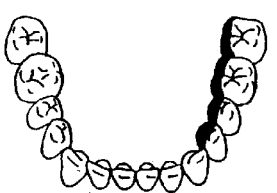
Figure 3P:
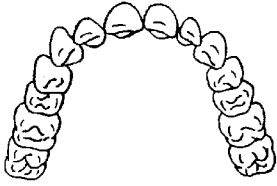
Figure 3Q:
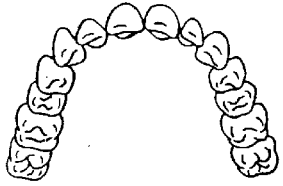
Figure 3R:
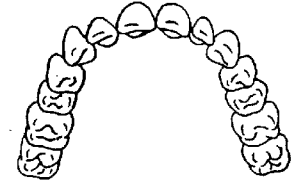
Figure 3R:
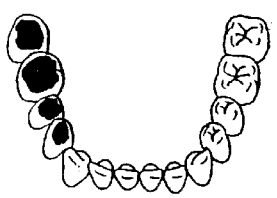
Figure 3R:
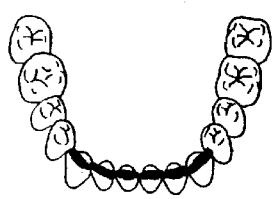
Figure 3R:
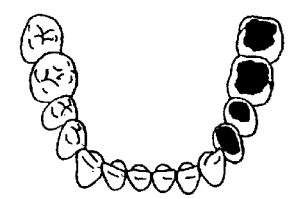

As is displayed in FIGS. 3A–3R, the individual teeth of each arch 14,16, and the individual surfaces 48,50,52,54 of the teeth can be illuminated. By illumination what is meant is to highlight or allow to stand out in some fashion. Illumination can be performed by any type of illuminator, including, but not limited to a light, a light emitting diode (L.E.D.), liquid crustal display or any other way of setting apart the object to be displayed. Additionally, the illuminated area could merely take one a different color or shade than the non-illuminated area.

Figure 4:
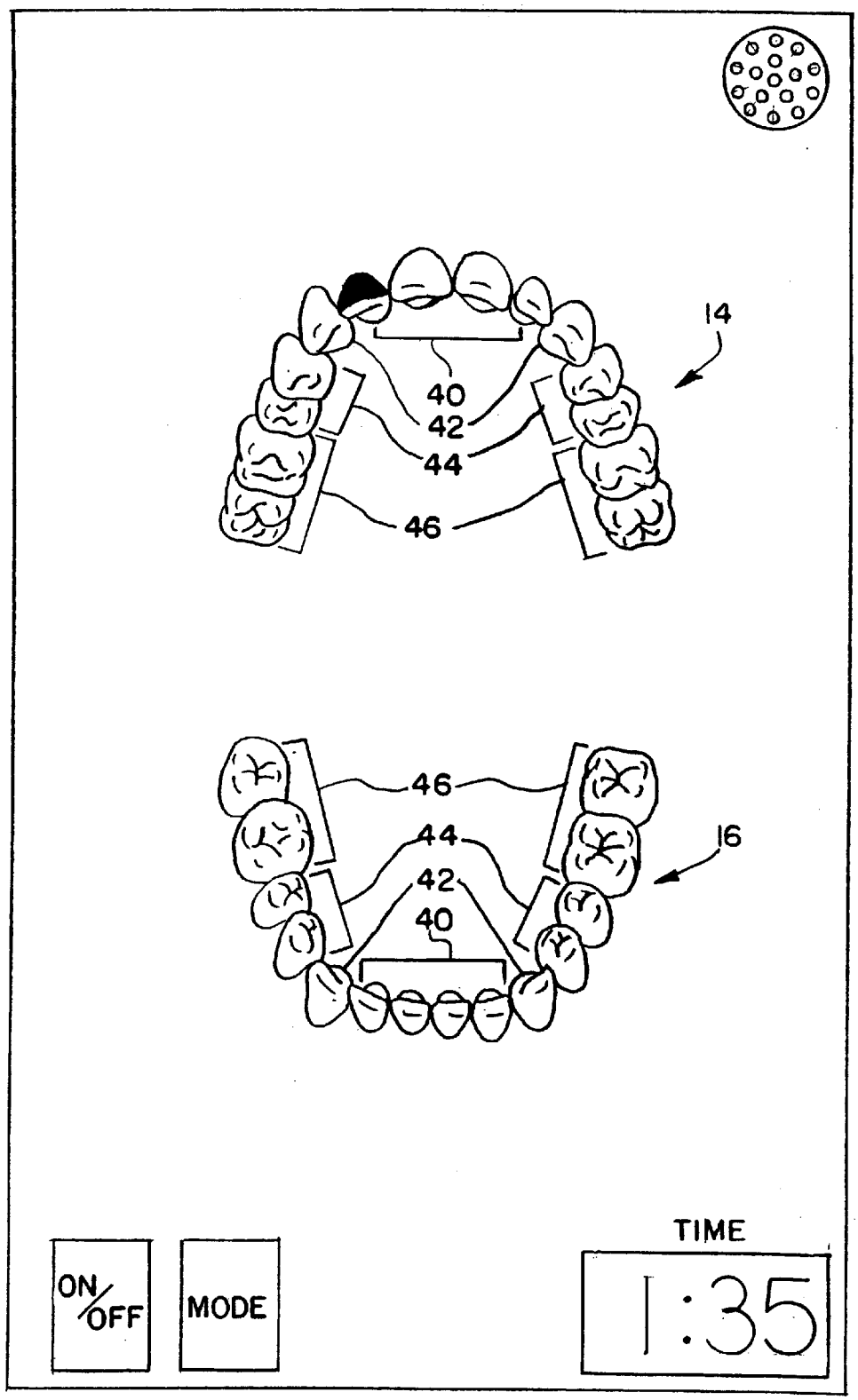

The teeth and/or surfaces of the teeth of the schematic can be illuminated individually and separately, or individually while in groups or sections, or merely in groups. The group sizes can include quadrants (wherein the mouth is divided into four groups per surface of teeth), sextants (wherein the mouth is divided into six groups per surface of teeth), or any other group size. By way of example, and as illustrated in FIG. 4, a single facial surface 48 of a one incisor 40 of the upper arch 14 can be separately illuminated. Also, as illustrated in FIG. 3A, one sextant of surfaces includes the individual facial surface 48 of two different molars 46 and two bicuspids 44 of the left side of the upper arch 14, and can be illuminated as a group. By illuminating a specific surface of several teeth at once, this instructs the user to brush that specific area (being the particular surface of several adjacent teeth) together, rather than merely instructing the user to attempt to brush a single tooth or surface of a tooth. Additionally, the true representations accurately instruct the user which teeth to brush. The displays of the present invention illustrated in FIGS. 1–4 have twenty-eight total teeth, the amount of teeth for an adult who has had their four wisdom teeth (i.e., the last two molars on each respective upper and lower arch) extracted. Alternatively, displays (not pictured) could show thirty-two total teeth, the amount for an adult who has not had any molars extracted. Additionally, different displays (not pictured) could also have a total of twenty teeth, representing a child's dentition, or twenty-four teeth, representing an older child's mixed dentition.

An entire and complete brushing of the mouth is illustrated in FIGS. 3A–3R. The brushing sequences in these figures are illustrative of a sextant group size. A sextant group size includes three groups for each surface of the upper arch 14, and three groups for each surface of the lower arch 16. A complete and balanced brushing is accomplished through nine sequences or screens of the display 10 for the teeth of the upper arch 14 (FIGS. 3A–3I), and nine sequences or screens of the display 10 for the teeth of the lower arch 16 (FIGS. 3J–3R). During each sequence, certain surfaces of teeth illuminate at once. For the upper arch 14, as shown in FIG. 3A, sequence one, the facial surface 48 of the left side two molars 46 and two bicuspids 44 of the first arch 14 illuminate together. Sequence two, shown in FIG. 3B, has the facial surface 48 of the two canines 42 and four incisors 40 of the first arch 14 illuminated together. Sequence three, shown in FIG. 3C, has the facial surface 48 of the right side two molars 46 and two bicuspids 44 of the first arch 14 illuminated together. Sequence four, shown in FIG. 3D, has the palatal surface 50 of the left side two molars 46 and two bicuspids 44 of the first arch 14 illuminate together. Sequence five, shown in FIG. 3E, has the palatal surface 50 of the two canines 42 and four incisors 40 of the first arch 14 illuminated together. Sequence six, shown in FIG. 3F, has the palatal surface 50 of the right side two molars 46 and two bicuspids 44 of the first arch 14 illuminated together. Sequence seven, shown in FIG. 3G, has the occlusal surface 52 of the left side two molars 46 and two bicuspids 44 of the first arch 14 illuminate together. Sequence eight, shown in FIG. 3H, has the occlusal surface 52 of the two canines 42 and four incisors 40 of the first arch 14 illuminated together. Finally, sequence nine, shown in FIG. 3I, has the occlusal surface 52 of the right side two molars 46 and two bicuspids 44 of the first arch 14 illuminated together.

For the lower arch 16, as shown in FIG. 3J, sequence ten, the facial surface 48 of the left side two molars 46 and two bicuspids 44 of the second arch 16 illuminate together. Sequence eleven, shown in FIG. 3K, has the facial surface 48 of the two canines 42 and four incisors 40 of the second arch 16 illuminated together. Sequence twelve, shown in FIG. 3L, has the facial surface 48 of the right side two molars 46 and two bicuspids 44 of the second arch 16 illuminated together. Sequence thirteen, shown in FIG. 3M, has the lingual surface 54 of the left side two molars 46 and two bicuspids 44 of the second arch 16 illuminate together. Sequence fourteen, shown in FIG. 3N, has the lingual surface 54 of the two canines 42 and four incisors 40 of the second arch 16 illuminated together. Sequence fifteen, shown in FIG. 3O, has the lingual surface 54 of the right side two molars 46 and two bicuspids 44 of the second arch 16 illuminated together. Sequence sixteen, shown in FIG. 3P, has the occlusal surface 52 of the left side two molars 46 and two bicuspids 44 of the second arch 16 illuminate together. Sequence seventeen, shown in FIG. 3Q, has the occlusal surface 52 of the two canines 42 and four incisors 40 of the second arch 16 illuminated together. Finally, sequence eighteen, shown in FIG. 3R, has the occlusal surface 52 of the right side two molars 46 and two bicuspids 44 of the second arch 16 illuminated together. These sequences are preset into the device, however, they can be changed or altered by the user as will be described later herein.

During each sequence, the illuminated surfaces may either remain illuminated or they may flash intermittently.

Additionally, between certain sequences, especially between sequences nine and ten, the instructional display 10 may pause, thereby allowing the user time for expectoration.

The oral hygiene instructional display 10 additionally has an audio source. As is shown in FIG. 1, the audio source has a speaker 22 which is located on the first side 28 of the body 10. The speaker 22, however, may alternatively be located on the second side 30 of the body 10. The audio source is controlled by the electronic circuitry of the device and produces different sounds when different teeth or surfaces of teeth are illuminated. As such, the audio source works in conjunction with the illumination of the teeth. The audio source operates by having sounds project from the speaker 22. The sounds can be in the form of music, tones, words or any other audibly recognizable means. As the sequence of illumination changes, the sounds from the audio source vary simultaneously to prompt the user to switch to a different surface or set of teeth. Additionally, the frequency of sounds or tones may maintain a certain pace to instruct or coach the user as to the velocity or frequency of brushing strokes. Finally, the audio source helps to maintain the interest and attention of the user by varying the volume and cadence such that the user will be prompted to view and follow the illuminating display.

Also as illustrated in FIG. 1, the oral hygiene instructional display 10 comprises a timer having a timer display 20 on the first side 28 of the body 10. The timer component includes an internal timing device which engages when the instructional display is turned on. Initially, the timer is preset to operate the instructional display 10 such that a complete cycle takes place over a two minute period (not counting any pause time for expectoration). As such, each sequence is preset for a divisible portion thereof. As will be explained later herein, the overall cycle time and individual sequence times can be adjusted by the user. The timer display 20 is generally located near the bottom 34 of the body 10. The timer display 20 can show either the time remaining, or the elapsed time. Additionally, the timer display 20 can show the elapsed time or time remaining for each sequence. As the overall time elapses, the electrical circuitry of the device manipulates the lighting of the teeth and various audio signals.

The oral hygiene instructional display 10 also includes a means for controlling the various features and parameters of the instructional display 10, including controlling the illumination, sequencing, timer, and audio source. Generally, the means for controlling the features of the instructional display 10 includes both the internal electronic circuitry and the function buttons 24,26. The function buttons 24,26 are small buttons located on the body 12. Preferably the function buttons 24,26 are located on the on the first side 28 of the body 12, near the bottom 34 of the display 10, as illustrated in FIG. 1. Alternatively, however, the function buttons 24,26 could be located on either the back side 30 or side edge of the body 12. The function buttons 24,26 operate the electronic circuitry when the buttons 24,26 are depressed. In one mode, the function buttons 24,26 allow the user to manipulate their way through a selection program, viewed on the timer display 20, for turning the device on and off, toggling the sound on and off, and raising and lowering the volume. In a second mode, the function buttons 24,26 allow the user to manipulate the type of audio sound. In another mode, the function buttons 24,26 allow the user to manipulate the grouping or size of grouping of teeth or surfaces of teeth which are illuminated during the separate sequences (i.e., sextants, quadrants, or other group size). In yet another mode, the function buttons 24,26 allow the user to manipulate the overall cycle time, the cycle time for each sequence and the expectoration time and frequency.

While the specific embodiments have been illustrated and described, numerous modifications come to mind without significantly departing from the spirit of the invention and the scope of protection is only limited by the scope of the accompanying claims.

We claim:

1. An oral hygiene instructional display of a human mouth, the display comprising:
    a substantially planar body having a first side, a second side, a top and a bottom; and,
    a representation of a plurality of teeth in an upper row forming a first arch having an apex and a representation of a plurality of teeth in a lower row forming a second arch having an apex, the apex of the first arch extending toward the top of the body and the apex of the second arch extending toward the bottom of the body, wherein the upper and lower rows of teeth are on the first side of the body, and wherein the teeth of the upper row and the lower row can be individually illuminated.

2. The instructional display of claim 1, wherein the teeth of the upper row and the teeth of the lower row each individually have numerous surfaces thereof displayed.

3. The instructional display of claim 2, wherein different surfaces of each tooth can be illuminated separately.

4. The instructional display of claim 1, wherein the first arch formed by the upper row of teeth is inverted from the second arch formed by the lower row of teeth.

5. The instructional display of claim 1 further comprising a timer, the timer having a display on the first side of the body.

6. The instructional display of claim 5, wherein the timer elapses from a preset time to zero.

7. The instructional display of claim 1 further comprising a means for producing audible sounds.

8. The instructional display of claim 7, wherein the audible sounds vary as different teeth illuminate.

9. The instructional display of claim 1 further comprising a means for controlling the illumination of the teeth.

10. The instructional display of claim 1 further comprising individual illuminators for each tooth.

11. The instructional display of claim 10, wherein each tooth can be illuminated individually.

12. The instructional display of claim 10, wherein multiple individual teeth can be illuminated simultaneously as a group.

13. The instructional display of claim 2, wherein surfaces of multiple individual teeth can be illuminated simultaneously as a group.

14. The instructional display of claim 2 further comprising individual illuminators for at least two surfaces of each tooth.

15. The instructional display of claim 1 further comprising at least one function button, wherein depressing the function button adjusts a parameter of the device.

16. The instructional display of claim 15, wherein depressing the function button toggles an audible sound on and off.

17. The instructional display of claim 15, wherein depressing the function button adjusts a timer.

18. The instructional display of claim 15, wherein depressing the function button adjusts a grouping size of teeth for illumination.

19. The instructional display of claim 1 further comprising an adhesive portion on the second side of the body.

20. The instructional display of claim 1 further comprising a magnetic portion on the second side of the body.

21. The instructional display of claim 1, wherein the display is waterproof.

22. An oral hygiene instructional display of a human mouth, the display comprising:

a substantially planar body having a top, a bottom, a first side and a second side;

an upper arch comprised of a representation of a plurality of teeth;

a lower arch comprised of a representation of a plurality of teeth, the upper arch extending away from the lower arch, wherein the teeth of the upper arch and the teeth of the lower arch have numerous surfaces thereof displayed, and wherein the teeth of the upper arch and lower arch can be individually illuminated;

a timer having a display on the body; and, an audible source which produces sounds in conjunction with the illumination.

23. The instructional display of claim 22, wherein different surfaces of the teeth are capable of being individually illuminated.

24. The instructional display of claim 22, wherein the audible sounds vary as different teeth are illuminated.

25. The instructional display of claim 22, wherein multiple teeth can be illuminated simultaneously as a group.

26. The instructional display of claim 25, wherein the grouping can be adjusted.

27. The instructional display of claim 22, wherein the timer can be adjusted for longer or shorter brushing periods.

28. An oral hygiene instructional display of the human mouth, the display comprising:

a substantially planar body having a top and a first side;

an upper row of teeth, the upper row depicting a facial view of a plurality of teeth and an occlusal view of a plurality of teeth, each tooth being adjacent at least one other tooth and the teeth forming a first arch, wherein a top of the first arch extends toward the top of the body;

a lower row of teeth, the lower row depicting the facial view of a plurality of teeth and the occlusal view of a plurality of teeth, each tooth being adjacent at least one other tooth and the teeth forming a second arch in the inverse direction of the first arch formed by the upper teeth, wherein the teeth of the first and second arch can be individually illuminated.

29. The instructional display of claim 28, further comprising a timer having a display on the first side of the body.

30. The instructional display of claim 28, further comprising an audible source which produces sounds in conjunction with the illumination.

31. The instructional display of claim 28, wherein the different surfaces of the teeth can be separately illuminated.

32. The instructional display of claim 28, wherein multiple teeth can be illuminated simultaneously as a group.

33. The instructional display of claim 31, wherein multiple surfaces can be illuminated simultaneously as a group.

* * * * *